Jan. 5, 1937.　　D. J. GREGORY ET AL　　2,067,083
BALE CUTTING MACHINE
Filed Aug. 16, 1932　　3 Sheets-Sheet 1

Jan. 5, 1937.  D. J. GREGORY ET AL  2,067,083
BALE CUTTING MACHINE
Filed Aug. 16, 1932    3 Sheets-Sheet 3

INVENTORS:
Dimitry J. Gregory and
Carl F. Schnuck,
BY
Fraser, Myers & Manley
ATTORNEYS Patented Jan. 5, 1937

2,067,083

UNITED STATES PATENT OFFICE 2,067,083

BALE CUTTING MACHINE

Dimitry J. Gregory and Carl F. Schnuck, New Haven, Conn., assignors to Farrel-Birmingham Company, Incorporated, Ansonia, Conn., a corporation of Connecticut Application August 16, 1932, Serial No. 629,004

9 Claims. (Cl. 164—36)

This invention relates to a machine for cutting up bales or blocks of suitable materials into sections. It is especially designed and adapted for cutting up bales or blocks of rubber, or other plastic or semi-plastic material, into pieces of suitable size and shape to be readily introduced between the mill rolls.

The cutting of bales or other large masses of rubber presents unusual difficulties which are not met with in the cutting or shearing of most other materials. If it be attempted to force a knife or knives into or through such a bale, the rubber compresses to a large extent, with the result that it hugs the blade so closely and with so much friction that large amounts of power must be expended in the cut. In mechanical cutting devices wherein it is designed to sever a bale into numerous sections at one operation, the number of linear feet of knife surface in contact with the bale is necessarily large and the friction developed is very high. It has been proposed to employ a gang of radially-arranged, broad knives and force them bodily and simultaneously into the bale until the latter is severed. In this type of device the knives are arranged at right angles to the line of cutting and all of the knives commence their cuts and end the same simultaneously. It has also been proposed to arrange knives one in advance of the other and to assist the action of the knives by heating their advancing edges to a high heat, thus partially melting the rubber and lessening to a certain extent the high compression which should be avoided. These methods either require very high pressure for a suitable number of cuts or endanger the rubber where it is softened by the heat of the knives.

According to the present invention we provide means for cutting such rubber bales which cover an arrangement of narrow knives arranged in approximately radial position, but inclined toward each other in such fashion that when the bale is forced through the knives, the outer edges of the bale are first cut and the cut sections are permitted to separate as fast as formed. In the operation of our invention, when the bale is forced into the basket of knives, each of the latter contacts with the bale (which is cubical in form) along small surfaces as distinguished from presenting the cutting edge of any one knife entirely to the bale and compelling it to commence its cut along its entire edge. At the beginning of the cutting operation the bale is put under compression, but since the cuts begin on the outer portions of the bale, such compression effectively forces the bale against most or all of the knife edges. Since the knives are arranged in a position which is inclined to the direction of cut rather than at right angles to it, as soon as any part of the bale is cut, the pressure begins to be relieved on the cut portions since they may move radially outward into constantly diverging spaces between the knives.

It is characteristic of the present invention that the cutting is essentially slicing; that is to say, it is accompanied by a movement having a longitudinal component between the bale and the knife edges. This of itself tends to reduce the necessary compression and facilitate the cutting operation. A further characteristic is that, due to the resistance which the rubber offers to the entrance of the knives thereinto, even with this slicing action, the bale, which is substantially encompassed by the knives and a platen which is employed to push the bale against the knives,—is under compression during the cutting operation, and this compression materially assists in forcing the rubber past the knives and laterally through the outwardly diverging spaces between the knives, thus minimizing, if not entirely eliminating, the frictional engagement of the cut rubber with the sides of the knives.

The invention is further augmented and the cutting considerably facilitated by the provision at the center of the knife basket of positive means for directing the partially severed sections outward in a radial direction, thus compelling the partially severed sections to separate and thereby relieve the pressure between the knives and such severed sections.

The cutting power is preferably derived from a hydraulic ram, and preferably the cutting head is stationary and the platen or pusher is moved by the ram. While the press may be arranged vertically, it is preferable to place it horizontally and to provide suitable rails for supporting the bale when laid in place for cutting.

A suitable embodiment of the invention is shown in the accompanying drawings, wherein—

Fig. 5 is a separate view of one of the knives.

Fig. 6 is a longitudinal section of the hub with its parts separated.

Figs. 7, 8 and 9 are axial elevations of the parts comprising the hub.

Figure 1:
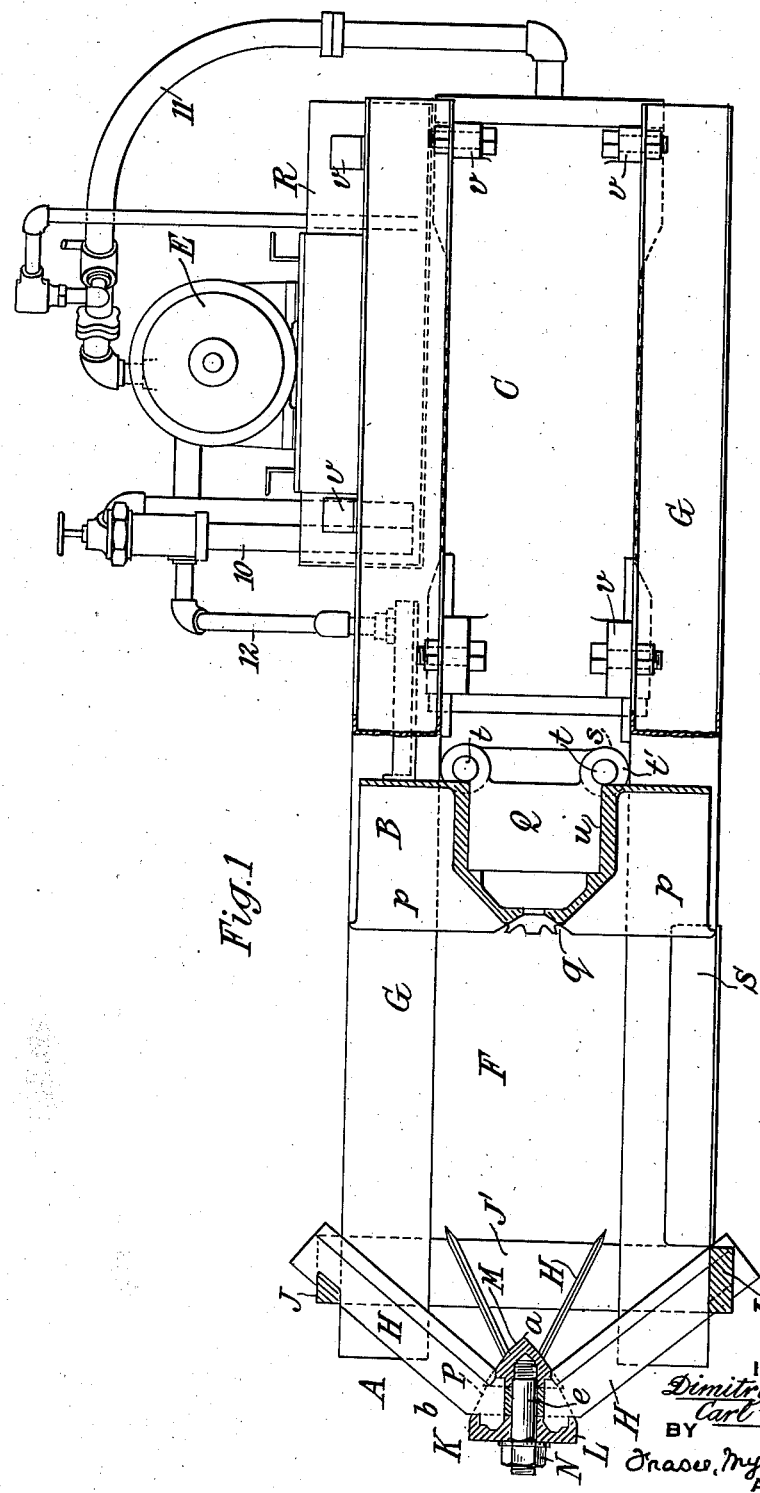
Fig. 1 is a side elevation of the machine partly in vertical, longitudinal midsection.

In the machine shown in the drawings, the cutting head A is stationary, and the platen or pusher B is movable, being advanced by a hydraulic press or ram C which is fed with oil or other liquid by means of a pump D driven by an electric motor E. The hydraulic press C and the cutting head A are fixedly mounted on stationary frame F, which is shown as constructed of four channel iron members G, G, to which the press cylinder and the cutting head are bolted or otherwise secured.

Figure 2:
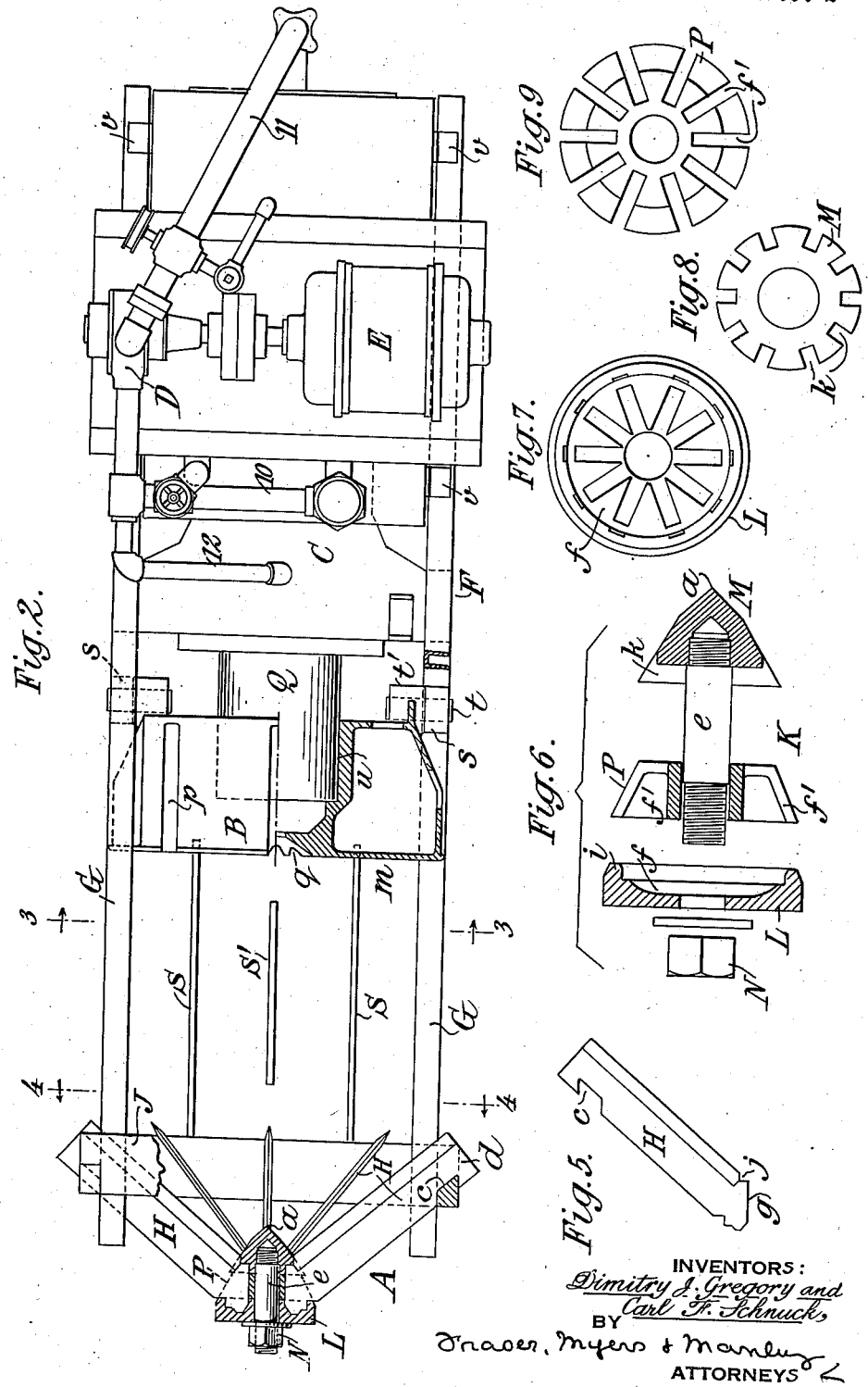
Fig. 2 is a plan of the machine partly in horizontal, longitudinal midsection.

The cutting head A is constructed with a plurality of knives H, H fixedly secured at their outer ends to a supporting frame or iron J, the latter being of such size and shape as to readily admit the passage through it of the bale and its cut sections. In the preferred construction the knives are arranged radially, as shown, for example, in Fig. 4, and with their outer ends in advance of their inner ends, as shown in Figs. 1 and 2. By reason of the oblique position of the radial knives, the cutting head forms a sort of openwork basket through which the bale is forced, the cutting edges on the front sides of the knives severing the bale into sections, and the latter, being as it were, extruded through the space between the knives. During this cutting operation the outer edges of the bale first contact with the several knives so that each of the latter can begin its cut at one point, and as it penetrates farther the cut is lengthened. The action is essentially a slicing action due to the longitudinal movement of the bale relatively to the inclined knives. As the partially cut sections pass the knife edges, they become less restricted and can expand into the increasingly large spaces due to the inclined arrangement of the knives and their radial extension.

An important feature of the invention is the provision of a means for assisting such outward movement of the partially cut sections by strongly assisting them in taking such outward paths. The means we have found best adapted for this purpose comprises the cone-shaped member a which penetrates the middle of the bale and forces the rubber sections outwardly. Preferably such cone-shaped member has an inclination such that their outward path will be along a line at right angles to the length of the blade, so that the sections pass the blades at their shortest dimensions.

In the organization set forth, the inner edges of the blades are mounted in a hub $k$ which has the double function of supporting the ends of the blades and also the head $m$ which is provided with the member $a$.

This arrangement of blades has another advantage in that it provides a mounting for the series of cutting knives in which the knives are supported completely around the basket and resist the strains of use by tension on the knives. This secures a very strong construction and permits the use of narrow knives.

Figure 4:
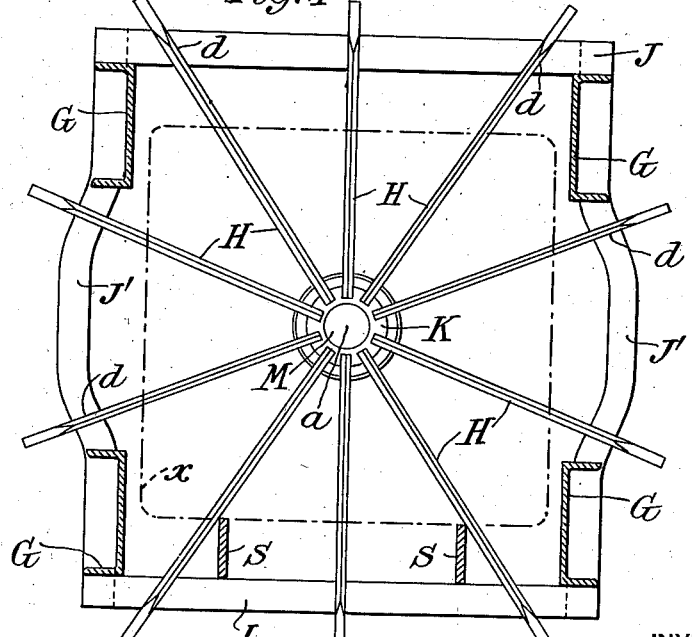
Fig. 4 is a transverse section on the plane of the line 4—4 in Fig. 2, showing the cutting head in elevation.

In the preferred construction ten knives (for example) are used, arranged radially in the manner shown in Fig. 4, the knives being formed with notches $c$ near their outer ends (see Fig. 5) and entering at their outer end portions into radial slots $d$ cut in the outer frame J, whereby a strong interlock between the knives and the frame is provided.

For making a secure attachment between the inner ends of the knives and the hub K, the latter is best constructed in the manner shown in detail in Figs. 6, 7 and 8. It consists of two members, a rear shell L, and a forward cone head M, drawn together by a nut end screwing on the threaded end of a central stud $e$ secured in the head M. Between the shell L and the head M is a spacing piece P which is centered on the stud $e$. The parts L and P may be made in one piece, but are more conveniently formed as separate parts. They both have coinciding radial slots $f$, $f'$, respectively, to receive the inner end portions of the blades. The inner end of each knife is formed with an inclined face $g$ to fit against the inner portions of the slots $f'$, and with a notch $h$ to engage the outer flange $i$ of the shell L, whereby the shell serves to tie together the inner ends of all the knives. To make the attachment secure, the cone head M enters into secure engagement with the front side of the inner end of each knife, the latter being formed with a notch $j$, this notch portion being received in a radial slot $k$ in the rear of the cone head. These slots $k$, $k$ are clearly shown in Fig. 8. Thus the inner end of each blade is clamped between the front and rear members L, M of the hub, and confined laterally or radially within the radial slots or notches $f$, $f'$ and $k$ of the respective members.

It results from this construction that the hub is securely anchored to the outer frame J through the medium of the radial knives H, H and itself serves to hold the inner ends of the knives in their correct relative positions. The knives are of such obliquity that the basketlike structure constituting the cutting head is of considerable depth, and the stresses upon the knives in cutting are resolved largely into tensile stresses longitudinally of the respective knives.

The knife supporting frame J is preferably made of horizontal top and bottom sections, as shown in Fig. 4, and of upright stud sections J, J', the middle portions of which are bowed outwardly, as shown in Fig. 4. The horizontal and vertical sections are halved together and fastened by bolts or threaded studs at the corners of the frame. The frame J is bolted to the channel iron main frame members G, G, which have their upper and lower flanges cut away coincident with the frame members J' to admit the latter into close engagement with the webs of the channel irons.

Figure 3:
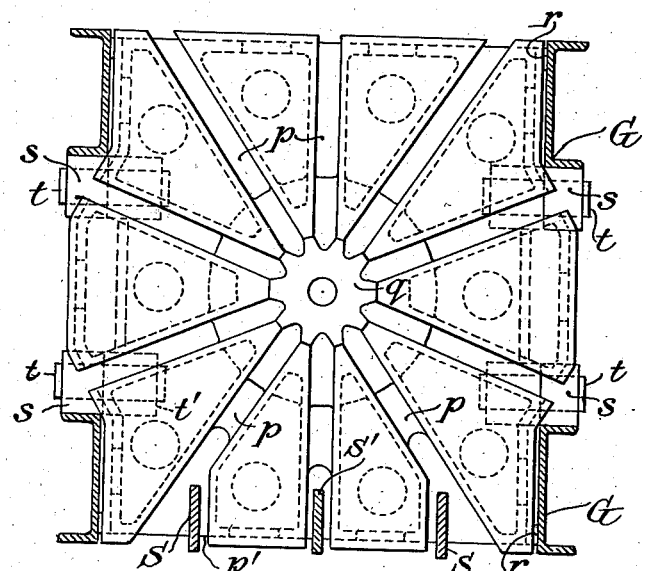
Fig. 3 is a transverse section in the plane of the line 3—3 in Fig. 2 showing the platen in elevation.

The platen or pusher B is preferably constructed as a box casing, having its advancing face $m$ flat in a plane perpendicular to the axis of movement of the hydraulic ram, and with deep grooves or slots $p$, $p$ (two of which are shown in section in Fig. 1) coinciding in position with the knives H, H (as is apparent on comparing Figs. 3 and 4). It has also at its center a conical depression $q$ (Fig. 1) to receive the conical apex $a$ of the hub K. The platen is of such dimensions as to fit freely between the four channel irons G, G forming the longitudinal tie members of the press, so as to be guided thereby in its movement. For thus guiding it, it has projecting lugs $r$, $r$ at top and bottom on both sides. For sustaining its weight and reducing the friction of its longitudinal movement, and for guiding its movement to prevent any deviation from a horizontal plane, it is provided with rollers $s$, $s$ mounted on pins $t$, $t$, held fast in lugs $t'$, $t'$ formed on the back of the platen. The lower rollers $s$ roll against the top flange of the lower channels G, while the upper rollers roll beneath the lower flanges on the upper channels G, thus effectively guiding the platen movements.

The platen casing is shown as formed with an internal recess $u$ receiving the end of the hydraulic ram plunger Q and fastened thereto so that the movements of this plunger force the platen both forwardly on its working stroke and rearwardly on its retractile stroke. The hydraulic press or ram may be of any suitable or known construction, the details of which form no part of the present invention. It is shown as having a fixed cylinder within which the plunger Q moves, this cylinder having flanges or lugs $v$, $v$ (Fig. 1) which are bolted to the respective tie members G, G. Above the cylinder is an oil tank R, from which a suction pipe 10 leads to the pump D, and from the pump a delivery pipe 11 leads to the cylinder for giving the working stroke, while pipe 12 leads to the opposite end of the cylinder for supplying oil to give the return stroke when the pump is reversed. The electric motor E is of the reversible type, and is controlled through any suitable switch or switches for starting and stopping and reversing the motor at will, it being desirable to provide a limit switch, as is used in such machinery for automatically stopping the motor at the end of the stroke of the ram. It is desirable to provide relief valves with by-passes which will discharge back into the tank any excess of oil whereby to relieve the pressure when it becomes too great. These details are not illustrated, as they are well understood in the art.

It is desirable to construct the machine as a horizontal press, the bales to be cut being put in position between the tie members G, G and between the platen and cutting head, so that in the cutting operation the cut sections, as they are forced from between the knives, will drop out freely by gravity beyond the cutting head. For this purpose it is desirable to provide supporting rails S, S, of such height as to support the bale with its middle in approximate coincidence with the axis of the cutting head. A middle rail S', Figs. 2 and 3, is also desirable. The approximate position of the bale when so supported is shown by the dotted outline $x$ in Fig. 4. To admit of the free movement of the platen, the latter has its lower slots $p$ widened at $p'$ (Fig. 3) to afford free clearance to the stationary rails S, S.

In operation, the bale placed in this position is pushed forward by the advance movement of the platen, being thereby forced against and between the knives. The slots $p$ and depression $q$ may be sufficiently deep so that the extreme movement of the platen will carry the bale entirely through the cutting head; it is, however, preferable to afford a somewhat shorter movement, leaving the bale partly uncut between the knives, and to complete its cutting by forcing it ahead of the next following bale at the next movement of the platen.

The described construction of the central hub K permits of convenient removal and replacement of individual knives, either for sharpening or in the event of breakage. The conical or expanding hub has the important function of piercing the bale or block of rubber and forcing the cut sections outwardly so as to give them radial relief while passing between the knives, thereby greatly diminishing the power required for cutting. The inclined location of the knives gives them an action in the nature of a draw cut, which also facilitates the cutting action. The supporting rails S, S lift the bale above the bottom of the cutting head so that its lower cut sections pass through freely between the knives. This free relief of the cut sections in all directions is particularly of great importance in the cutting of rubber, since, as before stated, the rubber block or bale has a tendency to swell outward under the pressure required for cutting, and if free egress for the extruding sections is not provided the friction builds up rapidly and seriously opposes, or may even preclude, the completion of the cutting stroke. Accordingly, the size of the basket-shaped cutting head, that is, the clearance space within the frame J, is made sufficient so that if the bale of rubber engages the apex of the hub K at approximately its center, there is ample space to provide the clearance found to be necessary.

While the preferred construction has been shown and described, it is to be understood that the invention is susceptible of considerable variation, in accordance with the specific work to be done or the special requirements as to speed and available space in any individual instance. While the radial arrangement of the cutting knives shown is preferable, yet other knife arrangements may be employed, and it is not essential that the knives shall be arranged in the form of a conical basket wherein all the knives cut simultaneously and equally, since other knife arrangements may be employed. Other variations may be made in accordance with the customary practices of mechanical engineers.

We claim:

1. A horizontal bale cutting machine having a cutting head with knives supported thereon, leaving free spaces between the knives, a stationary frame having tie members, a movable platen, a hydraulic ram for moving the platen, the cutting head and the cylinder of said ram made fast to said tie members and the platen guided by and between said tie members.

2. A horizontal bale cutting machine having a cutting head with knives supported thereon, leaving free spaces between the knives, a stationary frame having tie members of channel iron to which the cutting head is fastened, means reacting against said tie members for moving the platen, the platen entering between and laterally guided by the tie members, and having rollers rolling against the tie members to guide it against vertical displacement.

3. A bale cutting machine having a series of cutting knives and a relatively movable, power-driven platen for forcing the bale against and between the knives, the knives being mounted at an acute angle to the path of movement of the bale, whereby the outer edges of the bale are first cut and the cut progresses toward the center of the bale, the knives being arranged in cone form so that all sides of the bale are substantially simultaneously cut, and the knives being provided with a central hub for connecting their inner ends together, said central hub having a tapered portion projecting a considerable distance inwardly beyond the blades toward the platen and adapted to tend to separate the partially cut sections from each other.

4. A bale cutting machine for cutting commercial bales of rubber or other relatively compressible materials having a high coefficient of surface friction, into separated pieces, said machine comprising a cutting portion and a power-driven platen for pressing a bale into cutting engagement with the cutting portion, said portion comprising a series of knives mounted at an oblique angle to the path of movement of the bale and in a position to first engage and cut an outer side edge of the leading end of the bale and to progressively cut into and through the bale with the movement of the latter by the platen.

5. A bale cutting machine for cutting commercial bales of rubber or other relatively compressible materials having a high coefficient of surface friction, into separated pieces, said machine comprising a cutting portion and a power-driven platen for pressing a bale into cutting engagement with the cutting portion, said portion comprising a series of knives mounted at an oblique angle to the path of movement of the bale and in a position to first engage and cut all the outer side edges of the leading end of the bale and to progressively cut into the bale toward the center thereof during the cutting operation, the knives being arranged in cone form so that all sides of the bale are substantially simultaneously cut.

6. A bale cutting machine for cutting commercial bales of rubber or other relatively compressible materials having a high coefficient of surface friction, into separated pieces, said machine comprising a cutting portion and a power-driven platen for pressing a bale into cutting engagement with the cutting portion, said portion comprising a series of knives mounted at an oblique angle to the path of movement of the bale and in a position wherein the bale is first engaged and cut into, substantially simultaneously, by a small portion of each of said knives and the lengths of the cuts progressively increase with the movement of the bale by the platen until the maximum lengths of cuts are reached.

7. A bale cutting commercial machine for cutting bales of rubber or other relatively compressible materials having a high coefficient of surface friction, into separated pieces, said machine comprising a cutting portion and a power-driven platen for pressing a bale into cutting engagement with the cutting portion, said portion comprising a series of knives arranged conically with outwardly diverging spaces at the sides thereof through which cut portions of the bales may pass to the exterior of the knives and with their cutting edges disposed inwardly, the arrangement of the knives being such that the pressure of the knives and the platen upon the bale tends, during the cutting operation, to compress the bale and, hence, to increase the outward pressure of the bale against the knives whereby to enhance the cutting effect of the latter and to urge the partially cut portions of the bale outwardly through the said diverging spaces with a progressively decreasing frictional engagement of said cut portions with the knives.

8. A bale cutting machine for cutting bales of rubber or other relatively compressible materials having a high coefficient of surface friction, into separated pieces, said machine comprising a cutting portion and a power-driven platen for pressing a bale into cutting engagement with the cutting portion, said portion comprising a series of knives arranged conically with their cutting edges disposed inwardly and with outwardly diverging spaces at the sides thereof through which cut portions of the bales may pass to the exterior of the knives, the arrangement of the latter being such that the pressure of the knives and the platen upon the bale tends, during the cutting operation, to compress the bale and, hence, to increase the outward pressure of the bale against the knives whereby to enhance the cutting effect of the latter and to urge the partially cut portions of the bale outwardly through the said diverging spaces with a progressively decreasing frictional engagement of said cut portions with the knives, said machine, further, having means, extending within the conically arranged knives, adapted to engage the leading end of the bale and centrally oppose the movement of the bale during the cutting operation whereby to further increase the outward pressure of the bale against the knives and to urge the partially cut portions of the bale outwardly through the said diverging spaces with a progressively decreasing frictional engagement of said cut portions with the knives.

9. A bale cutting machine for cutting bales of rubber or other relatively compressible materials having a high coefficient of surface friction, said machine comprising a series of cutting knives arranged conically with outwardly diverging spaces therebetween and with their cutting edges disposed inwardly, a platen for pressing a bale into cutting engagement with said knives, and a piercing element disposed with its piercing point within the conically arranged knives, and being adapted to pierce a bale and to urge partially cut portions thereof outwardly through the said diverging spaces.

DIMITRY J. GREGORY.
CARL F. SCHNUCK.